US012761066B2

(12) United States Patent
Meyers et al.

(10) Patent No.: US 12,761,066 B2
(45) Date of Patent: Oct. 13, 2026

(54) GAS CYLINDER WEIGHT SCALE

(71) Applicant: CAIRE Inc., Ball Ground, GA (US)

(72) Inventors: Randal Meyers, Woodstock, GA (US); Beau Hart, Canton, GA (US); Chris Folsom, Cumming, GA (US)

(73) Assignee: CAIRE Inc., Ball Ground, GA (US)

( * ) Notice: Subject to any disclaimer, the term of this patent is extended or adjusted under 35 U.S.C. 154(b) by 288 days.

(21) Appl. No.: 18/742,831

(22) Filed: Jun. 13, 2024

(65) Prior Publication Data

US 2025/0383228 A1 Dec. 18, 2025

(51) Int. Cl.
*G01G 17/04* (2006.01)

(52) U.S. Cl.
CPC .................................... *G01G 17/04* (2013.01)

(58) Field of Classification Search
CPC ............................... G01G 17/04; G01G 19/52
USPC .............................................................. 177/1
See application file for complete search history.

(56) References Cited

U.S. PATENT DOCUMENTS

| | | | |
|---|---|---|---|
| 8,171,784 | B2 | 5/2012 | Hong |
| 8,639,226 | B2 | 1/2014 | Hutchings et al. |
| 10,768,041 | B2 | 9/2020 | Xu |
| 2017/0307141 | A1 | 10/2017 | Easey |
| 2021/0364130 | A1 | 11/2021 | Grevstad et al. |
| 2023/0296201 | A1 | 9/2023 | Mosher et al. |
| 2023/0302418 | A1 | 9/2023 | Groning |

FOREIGN PATENT DOCUMENTS

| | | | | | |
|---|---|---|---|---|---|
| CA | 2920940 C | * | 5/2018 | ............. G01G 17/04 |
| CN | 112629629 A | * | 4/2021 | ............. G01G 17/04 |
| DE | 102015009392 A1 | | 1/2017 | |
| JP | H07311075 A | * | 11/1995 | |
| WO | WO-03034003 A1 | * | 4/2003 | ............. G01F 23/20 |

OTHER PUBLICATIONS

Pigeon Gas Cylinder Trolley (https://www.flipkart.com/pigeon-gas-cylinder-trolley/p/itmecymjcdv7yvac) Nov. 13, 2023, 2 pages.

(Continued)

*Primary Examiner* — Peter J Macchiarolo
*Assistant Examiner* — Mireille S Sadate-Moualeu
(74) *Attorney, Agent, or Firm* — Leason Ellis LLP; Jordan Garner; Mitsuhiro Haraguchi

(57) ABSTRACT

A weight scale for a gas cylinder with an impact resistance system has a rotatable top housing and a bottom housing, which is located opposite the lower surface of the top housing. The top housing has a top protruding portion that protrudes toward the bottom housing and a caster bearing that is rotatably mounted on the lower surface of the top housing. The bottom housing has a caster ramp provided on the upper surface thereof such that the caster bearing can roll down the caster ramp when the top housing is pushed down and rotates with respect the bottom housing. A weight sensor is placed on the upper surface of the bottom housing adjacent the ramp. The weight sensor is configured to measure the weight of the gas cylinder when the caster bearing rolls off the caster ramp and onto the weight sensor.

18 Claims, 11 Drawing Sheets

(56) References Cited

OTHER PUBLICATIONS

Gas Cylinder Level Sensor (https://www.thincke.com/product/gas-cylinder-level-sensor/) 2021, 6 pages.
Gas Cylinder Scale (Manufacture: GasQuip) Nov. 13, 2023 (https://gasquip.com/wp-content/uploads/2023/02/GAS-CYLINDER-SCALE-GQ-GCS.pdf), 2 pages.
Smart Wireless Propane Tank Scale (https://flameking.com/product/ysnps1-2/) 2019, 2 pages.
Extended European Search Report mailed Nov. 10, 2025 for the corresponding European Patent Application No. 25182170.8: Total 6 pages.

* cited by examiner

GAS CYLINDER WEIGHT SCALE

FIELD OF THE INVENTION

The present invention relates to a weight scale for a gas cylinder that is capable of mitigating an impact from the gas cylinder when it is placed on the scale to measure its weight.

BACKGROUND OF THE INVENTION

Stored gases, such as $O_2$, liquified petroleum gas (LPG) and others have a wide variety of commercial and private uses, e.g., for medical applications, heating, cooking, welding, etc. Such gases can be supplied in large gas cylinders. As the gas is used the amount of gas in the cylinder decreases. Thus, these cylinders must be periodically replaced or refilled during their period of use. However, waiting until the cylinders run empty can be very costly for businesses, especially if essential medical treatments, appliances or devices rely on the gas to operate. Thus, it can be important to know the amount of gas remaining in the cylinder.

The optimum time for cylinder replacement is just before the cylinder becomes empty because the consumer pays for the number of cylinders used, not the amount of gas consumed. However, the loss of gas from the cylinder can not only occur because of normal use, but leaks can occur. Thus, it can be problematic to estimate the amount of gas remaining merely based on normal use and the passage of time.

The most common way of determining the amount of gas remaining in a cylinder is by weighing the cylinder. One example of a prior art system is described in DE102015009392 which provides a device for measuring the amount of LPG in a single pressure vessel and transmitting the information to a central database. The weight of the pressure vessel is measured and the amount of gas in the vessel is determined using a microprocessor, based on the weight measurement. The weight of each cylinder is measured by one sensor positioned underneath the cylinder in order to collect data, such as weight data, from the cylinder.

The art also includes various weight scales for gas cylinders or gas tanks. For example, the weight measuring system in the US Patent Application Publication No. 2021/0364130 ("the '130 Publication") includes a load sensor configured to detect the weight of the cylinder at predetermined time intervals; a temperature sensor configured to detect a temperature local to the cylinder at the predetermined time intervals; and a processing unit configured to: receive weight signals and temperature signals from the load sensor and temperature sensor, respectively; determine, based on the received weight and temperature signals, the status of the gas cylinder; and automatically provide an indication of the status of the gas cylinder to a user.

U.S. patent Ser. No. 10/768,041 discloses a weighing scale that comprises a scale body and a detecting board. The scale body includes a platform in contact with the feet of a subject, a weighing mechanism, a signal processor, a wireless communication device, and a display screen. One embodiment of the weighing scale includes a signal emitter and a signal receiver for measuring the distance between the platform and the detecting board, which is an indication of the weigh.

One of the challenges when measuring the weight of a gas cylinder is the negative effect on the load cells of the scale due to the physical impact that occurs when the gas cylinder is placed on the scale.

Gas cylinders are typically made of materials like steel or aluminum. Common sizes include small cylinders for household use, such as those used for propane or butane cooking ranges, and larger cylinders for industrial or medical gas uses. For example, a standard 20-pound propane cylinder used for grills and camping typically weighs around 38 pounds (17.2 kilograms) when full. However, larger industrial cylinders used for welding or other applications can weigh significantly more, with some exceeding 100 pounds (45 kilograms) or more when filled with gas. In particular, cylinders of portable liquid oxygen (LOX) may weigh as much as 165 pounds (75 kilograms) when full.

Accordingly, when a gas cylinder is placed on the weight scale for weight measurements, even if carefully handled, a significant impact on the scale is inevitable, which may lead to a malfunction of the load measuring cells in the device. If the weight scale is used frequently, the chances of malfunction will increase while the product life may decrease.

In general, the weight of a gas cylinder is measured when refilling or replacing the cylinder. The most common method to refill/replace a gas cylinder is for the user to place a phone call to the provider (or distributor) when the supply is nearly exhausted. However, because gas cylinders are made of metals, it is difficult to know the amount of gas remaining in the tank at any time unless a gauge or meter for detecting a remaining amount is installed in the cylinder.

Another problem with current methods is the physical effort it takes to order the refilling or replacement of the gas cylinders. The user must contact the liquid gas provider who performs a "milk route" to visit the user and refill and/or replace the cylinders on a recurring basis, which requires additional steps and time.

The '130 Publication also discloses a system for determining the status of a gas cylinder that comprises a load sensor configured to detect a weight of the cylinder at predetermined time intervals. In this system, a cylinder placed on a sensor to detect and weigh the cylinder is monitored remotely through a system for managing deployed cylinders. For this purpose, the weight scale includes a transceiver configured to receive signals from the load sensor and a temperature sensor, which signals correspond to weight data and temperature data, respectively. These signals are sent to the processing unit. In this way the processing unit may be located centrally to enable a lightweight sensor at the premises to be installed. Further, the status of the cylinder can be provided to the user by way of a portable device so the user can be remotely notified. However, this system discloses no way to protect the load sensor during initial installation of the cylinder on the load sensor.

Thus, what is needed in the art are apparatus, systems and methods to overcome the above-mentioned problems and to provide a weight scale for a gas cylinder that is capable of avoiding harmful impacts on the weight sensor, while efficiently monitoring the level in the gas cylinder and automatically ordering refills or replacements.

SUMMARY OF THE INVENTION

In one or more configurations, a weight scale for a gas cylinder that incorporates an impact resistance system is provided. The weight scale includes a rotatable top housing with a lower surface and an upper surface adapted to receive the gas cylinder. There is also a stationary bottom housing with an upper surface, which is located opposite the lower surface of the top housing when the weight scale is assembled. A top protruding portion that is provided at a center of the lower surface of the top housing protrudes from the top housing toward the bottom housing and provides an axis about which the top housing can rotate with respect to the lower housing. At least one caster bearing is rotatably mounted on the lower surface of the top housing and at least one caster ramp is provided on the upper surface of the bottom housing such that the caster bearing can roll down the caster ramp when the top housing is pushed down on the bottom housing by the weigh of the cylinder. Further, this motion causes the top housing to rotate with respect to the bottom housing as the bearing rolls down the ramp. At least one weight sensor is placed on the upper surface of the bottom housing adjacent to the end of the caster ramp. This weight sensor is configured to (a) weigh the gas cylinder when the caster bearing rolls off the caster ramp and onto the weight sensor and (b) provide weight data.

In operation, when a gas cylinder is placed on the upper surface of the weight scale of the present invention, its weight acts on the top housing pressing it downward. Because the caster bearings mounted on the lower surface of top housing roll down caster ramps installed in the facing upper surface of the bottom housing, the top housing rotates in relation to the bottom housing and descends toward the bottom housing. Eventually the casters come to rest on a grooved plate portion of the weight sensor located on the upper surface of the bottom housing. The plate portions are connected to weight sensors in the bottom housing. Due to the shallow angle of the caster ramp, almost all of the impact from the gas cylinder placed on the scale is transferred to the top housing, through the caster bearings and on to the caster ramp of the bottom housing.

During the descent of the top housing, a fraction of the cylinder weight (i.e., vertical force) is converted into the rotational motion to bring the caster bearings to the weight sensor. In particular, a vertical impact of the gas cylinder is transferred in a delayed and slowed manner to the loadcells. As a result, the impact of the gas cylinder's weight on the weight sensors is mitigated, which leads to accurate measurement and avoids harmful impacts on the weight sensor. Thus, the product life of the sensor can be prolonged.

Further, a method is provided for monitoring the weight of a gas cylinder. The method comprises the steps of: placing the gas cylinder on the weight scale; measuring the weight of the gas cylinder; transmitting measured weight data wirelessly to a remote network (e.g., one to which the supplier/distributor is connected); and automatically logging the measured weight at predetermined time intervals.

Thanks to the described method, the weight scale functions as a remotely connected (wireless) weight scale. For example, the weight scale is able to provide information directly back to the provider/distributor through a cloud network relying at least an amount remaining in the cylinder, a flow rate, battery life and other parameters. As a result, the gas providers can analyze the information and optimize their delivery schedules by addressing users with low gas levels. This provides an extra benefit to gas providers who replace cylinders since it allows them to make deliveries just in time and it helps gas users to reduce the waste of the liquid gas from prematurely replacing the cylinders.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
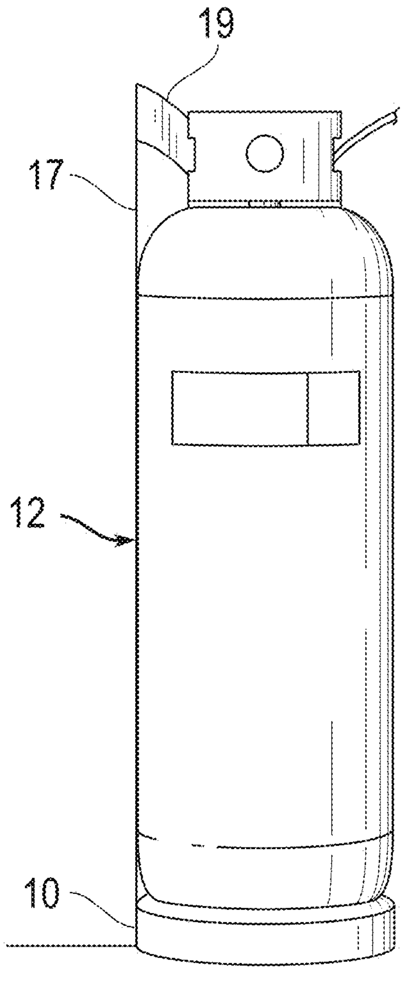
FIG. 1 is an elevation view of a large liquid gas cylinder resting on a weight scale according to the present invention.
Figure 2:
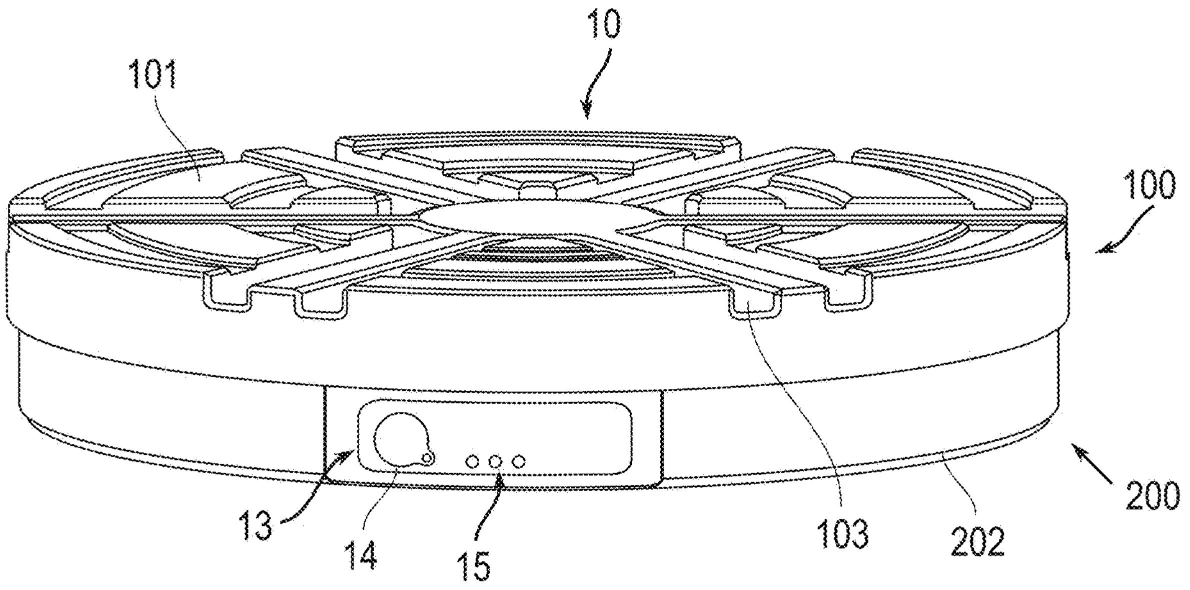
FIG. 2 is a front top perspective view of the weight scale according to an embodiment of the present invention.

The present disclosure is directed to a weight scale 10 (FIG. 1) for measuring the weight of a gas cylinder 12 resting on its top as a way of determining the level of the gas in the cylinder. Cylinder 12 is placed adjacent a wall 17. While not always necessary, the cylinder 12 is fastened to the wall 17 by a bracket 19. The scale 10 includes a rotatable top housing (first housing) 100 with a lower surface 102 (FIG. 3) and an upper surface 101 adapted to receive the gas cylinder 12 (FIG. 2). In addition, the scale includes a stationary bottom housing (second housing) 200 with an upper surface 201 (FIG. 4), which is located opposite the lower surface 102 of the top housing 100 when the weight scale 10 is assembled.

In one or more configurations of the weight scale 10, the top housing 100 and bottom housing 200 are formed of one or more of aluminum, steel, high-impact plastic, carbon fiber or other composite materials.

In yet a further embodiment of the weight scale 10, the top housing 100 has one or more groves or channels 103 on the upper surface 101 thereof. As shown in FIG. 2, these grooves or channels 103 extend in the radial direction and allow a cylinder/tank 12 or other storage device, which typically has a flat bottom surface, to securely sit on the upper surface 101 of the top housing 100. Further, the grooves or channels 103 provide structural integrity to the top housing 100 and are uniquely designed such that the upper surface 101 of the top housing 100 can be "interlocked" with the lower surface 202 of the bottom housing 200. As a result, weight scales 10 according to the present invention are easily stackable without sliding apart.

The bottom housing 200 has an outer interface 13 that contains a power button 14 and LED lamps 15, which are used during installation and troubleshooting of the scale.

Figure 3:
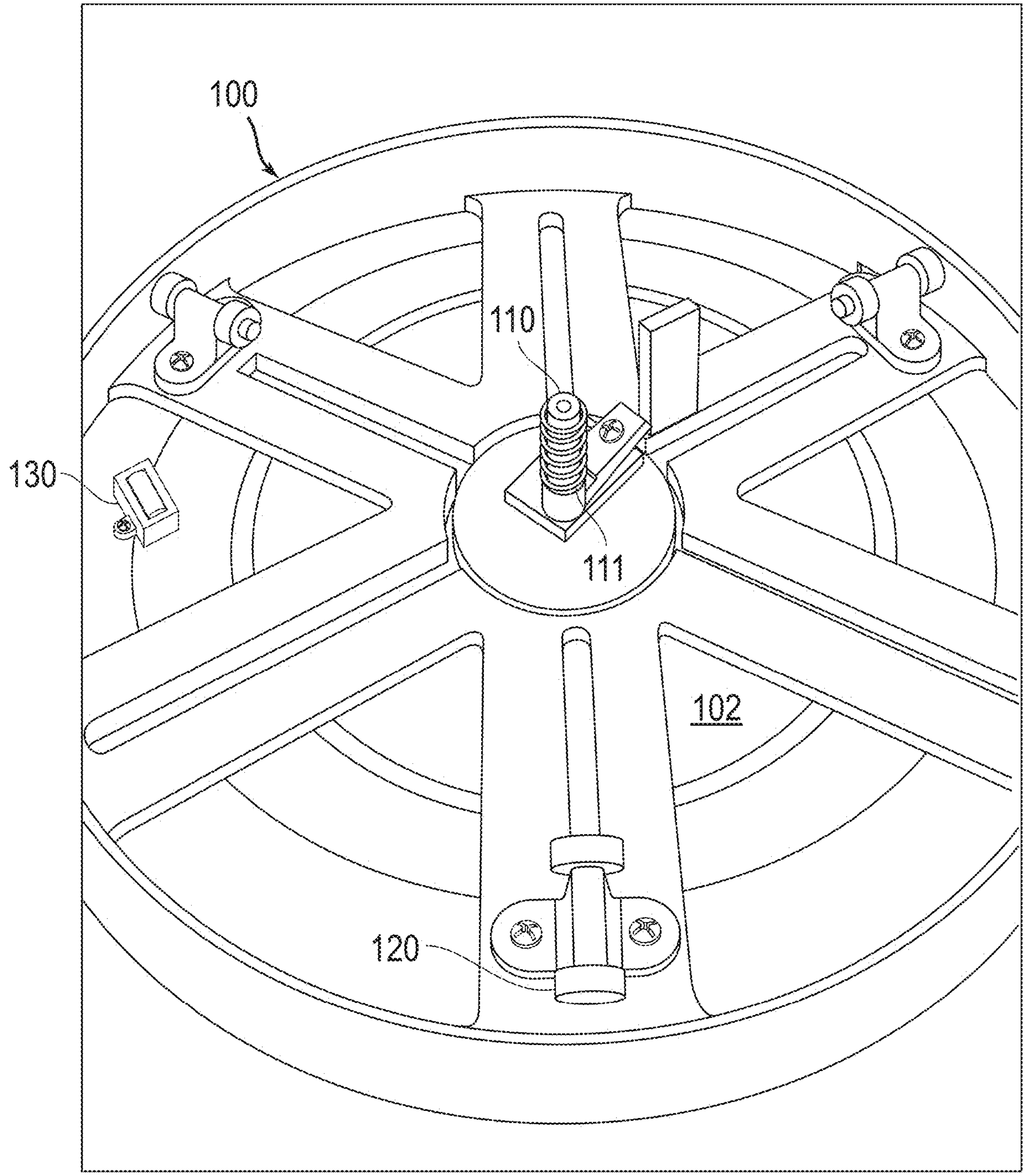
FIG. 3 is a perspective view of the lower surface of the rotatable top housing of the weight scale of FIG. 1.

As shown in FIG. 3, the top housing 100 contains a top protruding portion 110, at least one caster bearing 120 and a magnet 130. The top protruding portion 110 is provided at a center of the lower surface 102 of the top housing 100 and protrudes from the top housing 100 toward the bottom housing 200. A compression spring 111 is placed to surround the top protruding portion 110. The magnet 130 is attached to the lower surface 102 of the top housing 100.

Figure 4:
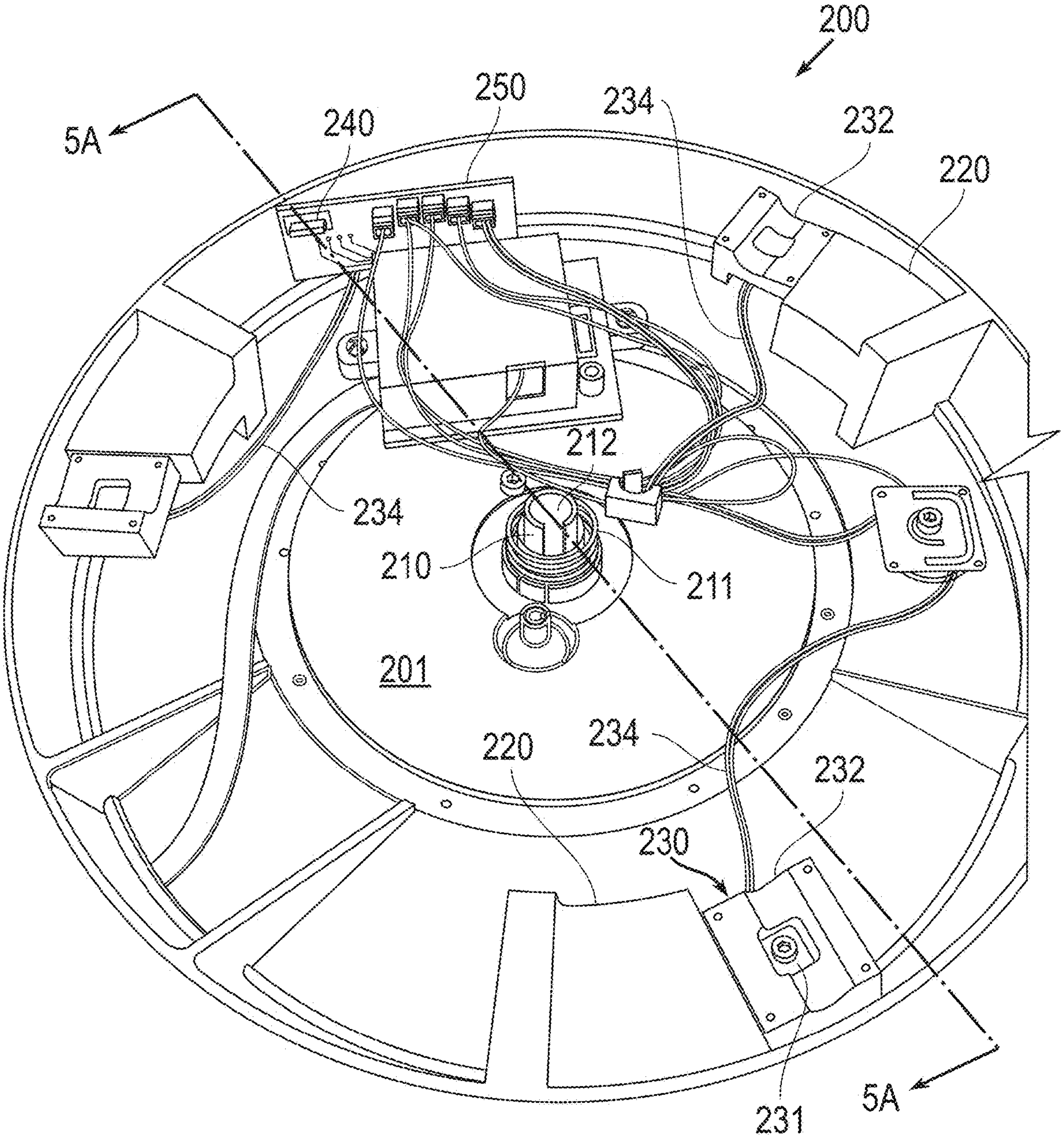
FIG. 4 is a perspective view of the upper surface of the stationary bottom housing of the weight scale of FIG. 1.

As shown in FIG. 4, the bottom housing 200 contains a bottom protruding portion 210, at least one caster ramp 220, at least one weight sensor 230, a reed switch 240 (as a non-limiting example of a detection switch) provided on a circuit board 250. The bottom protruding portion 210 is provided at a center of the upper surface 201 of the bottom housing 200 and protrudes from the bottom housing 200 toward the top housing 100.

Figure 9:
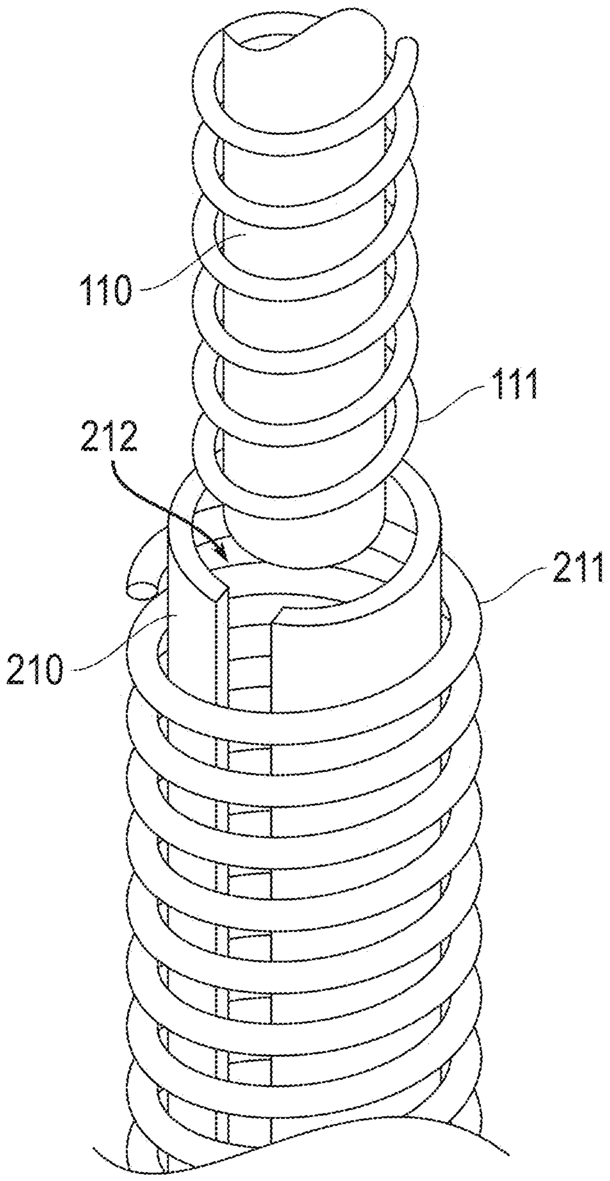
FIG. 9 shows a top protruding portion of the top housing with a surrounding spring and a bottom protruding portion of the bottom housing with a separate surrounding spring.

As shown in FIG. 9, the bottom protruding portion 210 has a through hole 212 into which the top protruding portion 110 is inserted. A torsion spring 211 is placed around the bottom protruding portion 210 and a compression spring 111 is placed around the top protruding portion 110. Protruding portions 110, 210 form an axis about which the top housing 100 can rotate with respect to the bottom housing 200.

Continuing with the elements described in FIG. 4, the circuit board 250 may be located adjacent to the outer circumferential portion of the upper surface 201 of the bottom housing 200 and is connected to a plurality of the weight sensors 230 via wires 234. The reed switch 240 may be located on the periphery of housing 200, preferably on the circuit board 250. It is closed only when the top housing 100 is rotated so that the magnet 130 is over the switch 240. The caster bearings 120 are rotatably mounted on the lower surface 102 of the top housing 100 (as shown in FIG. 3). The caster ramp 220 is provided on the upper surface 201 of the bottom housing 200 (as shown in FIG. 4) such that the caster bearing 120 can roll down the caster ramp 220 when the top housing 100 is pushed down on the bottom housing 200 and rotates with respect thereto (as shown in FIGS. 5A and 5B) due to the weight of the gas cylinder 12 being placed on the scale 10.

Figure 5A:
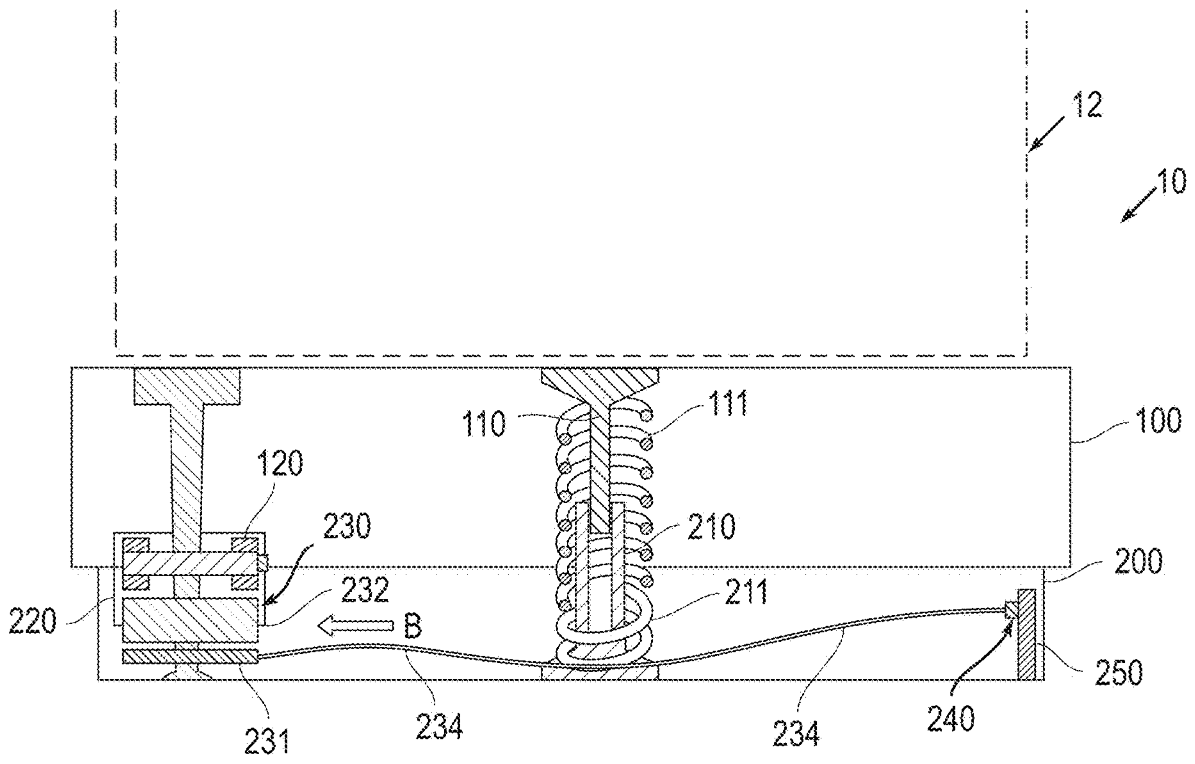
FIG. 5A is a cross-sectional view of the weight scale of FIG. 1
Figure 5B:
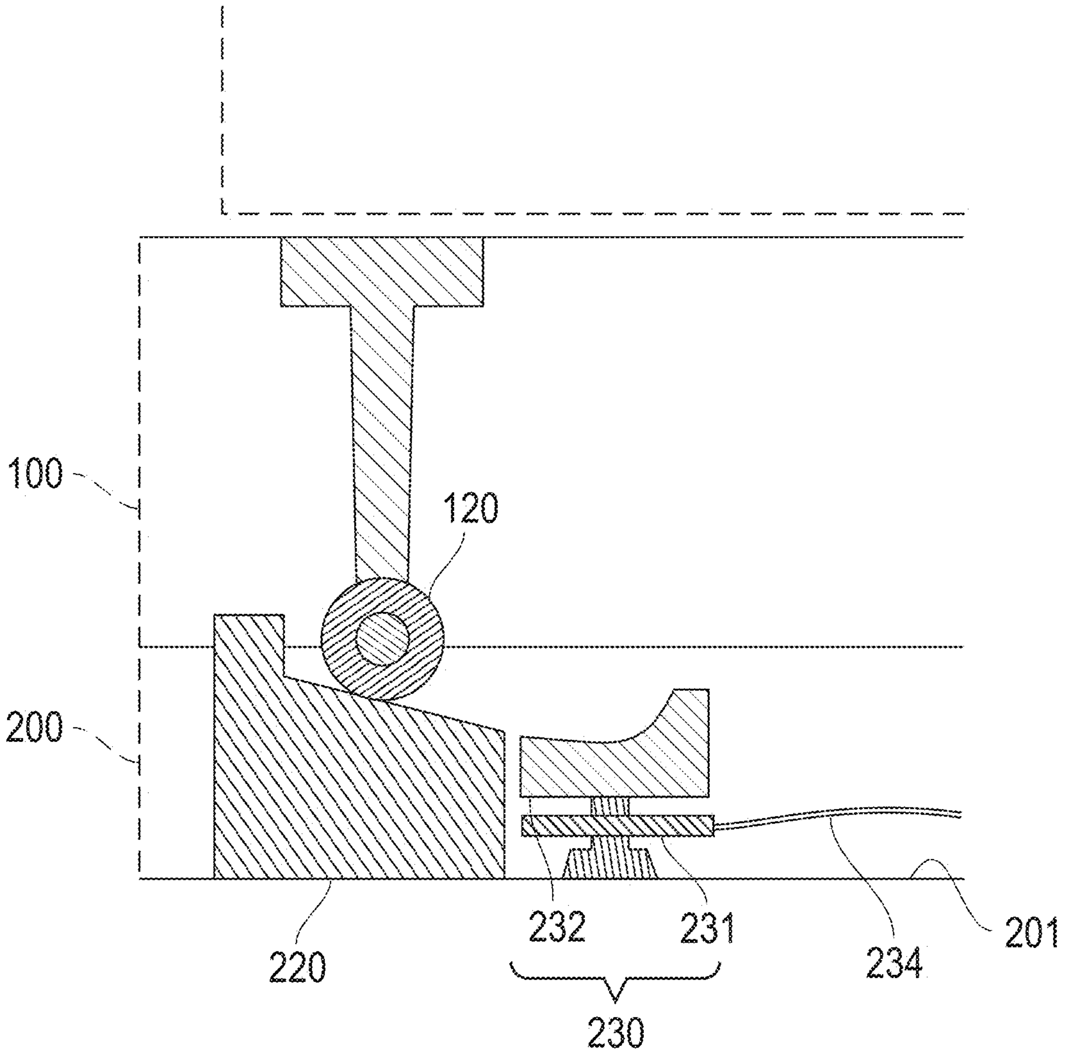
FIG. 5B is a partial view of the weight scale as shown in FIG. 5A in the direction of arrow B.
Figure 6A:
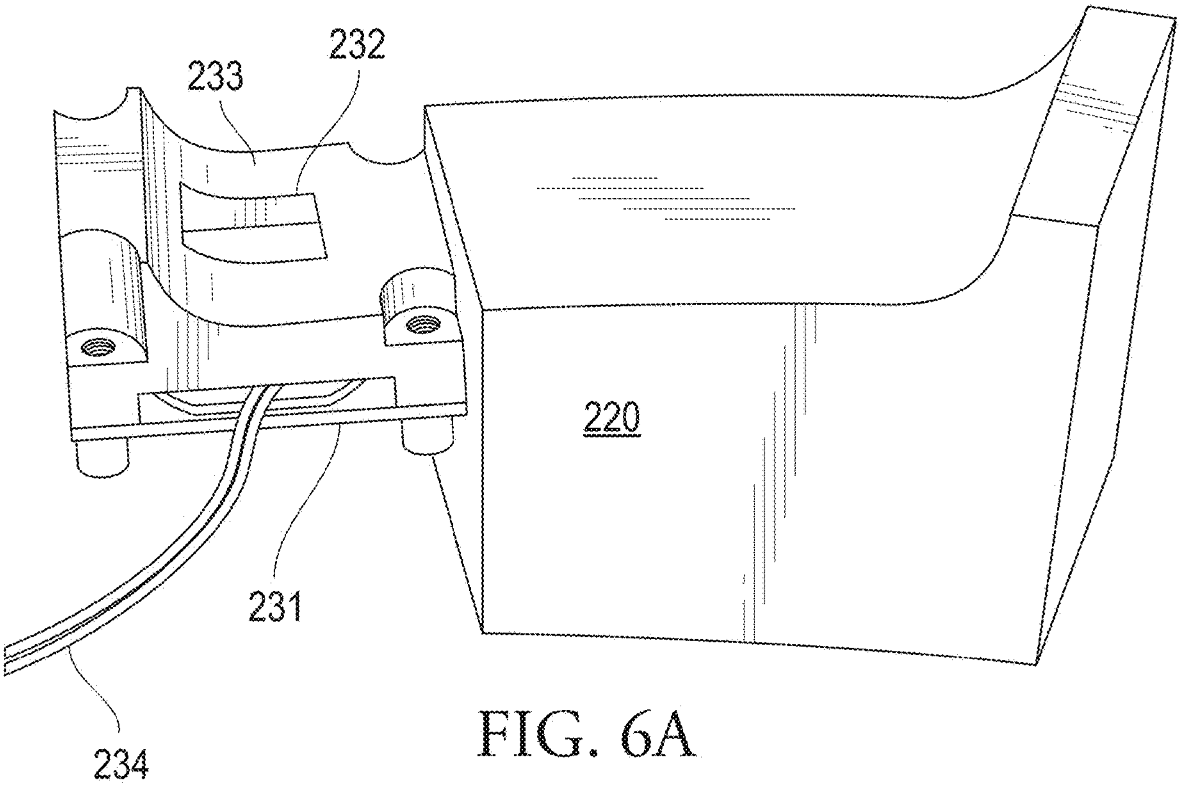
FIG. 6A is a detailed enlarged perspective view of a caster ramp and a weight sensor containing a loadcell and a grooved plate according to the present invention and FIG. 6B is a partial cross-sectional view of the components presented in FIG. 6A.
Figure 6B:
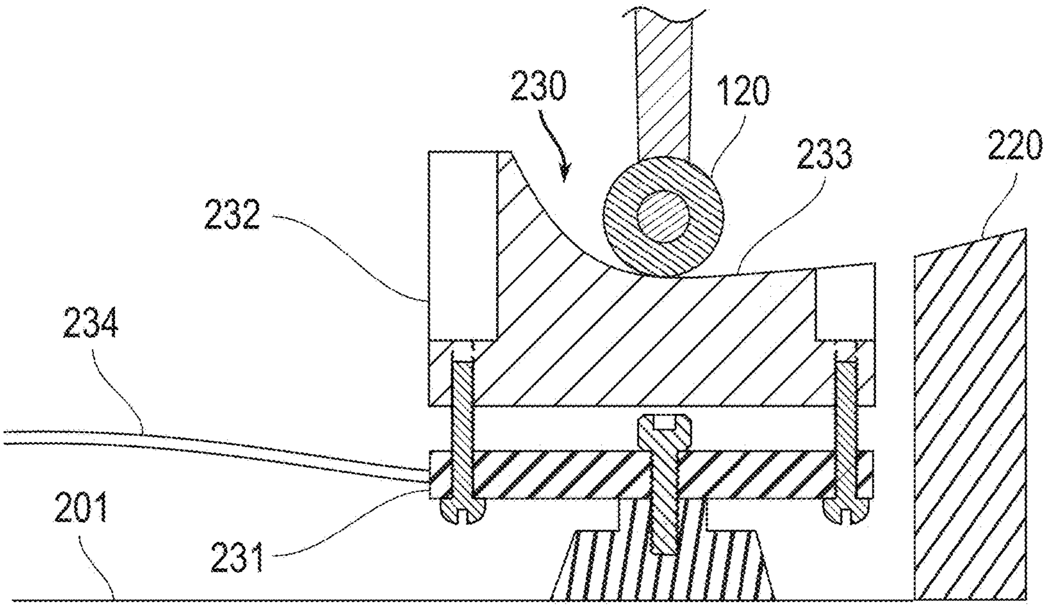

As shown in FIGS. 5A and 5B, the weight sensor 230 is placed on the upper surface 201 of the bottom housing 200 adjacent to the caster ramp 220 and is configured to weigh the gas cylinder 12 when the caster bearing 120 rolls off the caster ramp 220 and onto the weight sensor 230. As shown in FIGS. 6A and 6B, the weight sensor 230 comprises a loadcell 231 (also see FIG. 8) and a grooved plate 232 (also see FIG. 7) attached to the loadcell 231.

Figure 7:
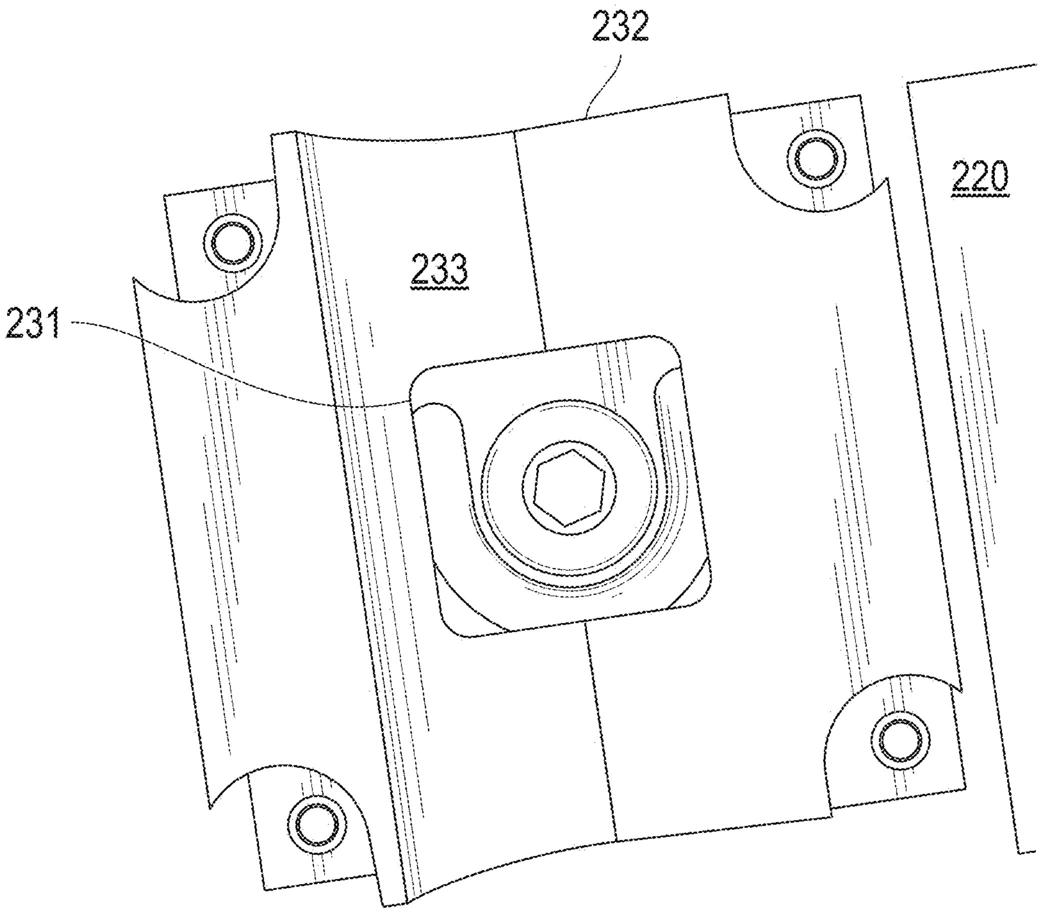
FIG. 7 is a plan view of the weight sensor of FIG. 6A.
Figure 8:
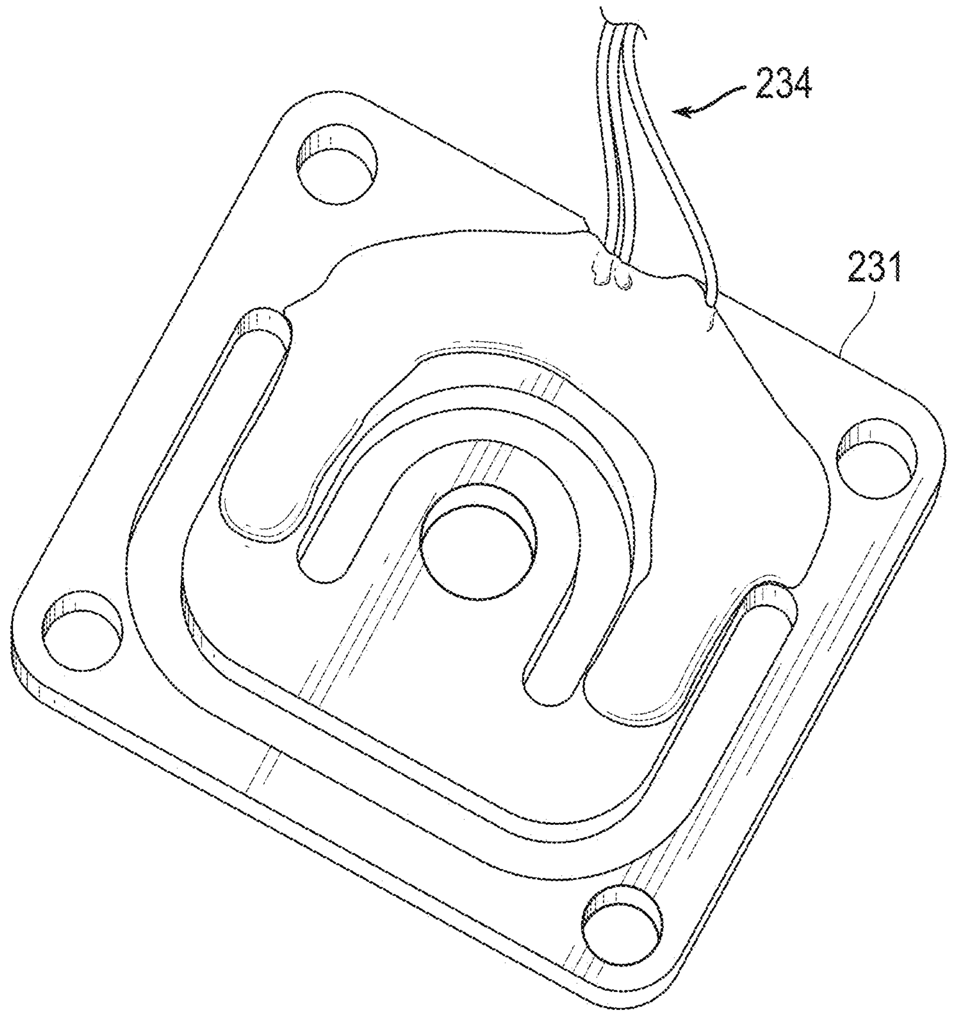
FIG. 8 shows a detailed enlarged perspective view of the loadcell of the weight sensor.
Figure 10:
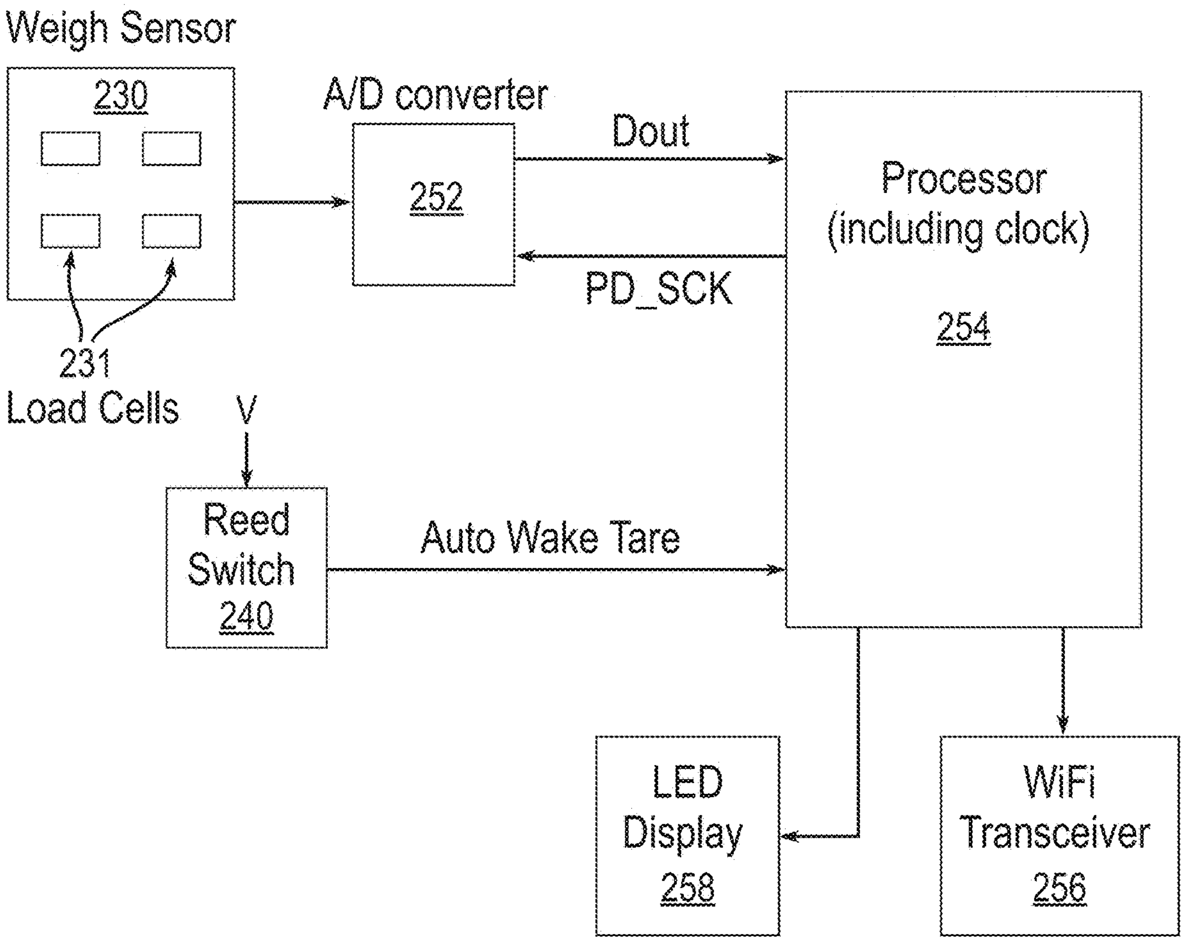
FIG. 10 is a block diagram of a circuit with a reed switch and a processor for operating the present invention.

The grooved plate 232 has a groove portion (rest position surface) 233 adapted for seating the caster bearing 120 (FIG. 6B and FIG. 7). As shown in FIG. 5 and FIG. 8, the loadcell 231 is connected to the circuit board 250 by wires 234. When a gas cylinder is placed on the weight scale 10, the loadcell 231 of the weight sensor 230 is automatically activated to detect its weight via the caster bearing 120. Then, the sensor 230 transmits weight signal to the circuit board 250 through wires 234. (FIGS. 5A and 5B) The weight signal is also transmitted to a cloud network (not shown) later. A block diagram of the circuit on the circuit board 250 is shown in FIG. 10 and includes a processor 254 that converts the signal from the weight sensor 230 into a digital value. This processor 254 also controls the operation of the scale 10.

In particular, as shown in FIG. 10, when the loadcells 231 of the weight sensors 230 are activated, they produce output analog signals that are summed and converted into a digital weight signal Dout by analog/digital (A/D) converter 252. The timing for Dout comes from the processor 254 that has an internal clock (not shown). PD-SCK is a power down and serial clock signal provided to the A/D converter 252. This processor 254, in a preferred embodiment, then passes this weigh signal Dout to a memory in processor 254. Based on the accumulated weight readings. an indication that the weight is low, and hence the tank is nearly out of gas, is passed onto a cloud based system. In particular, the processor sends information on the weight determination to a Wi-Fi transceiver 256 for broadcast to a remote (e.g. cloud based) location. When the cylinder is lifted from the weight scale 10, the top housing 100 rotates back to its original (unloaded) position, which brings the magnet 130 into proximity with the reed switch 240. The reed switch 240 then closes and produces an Auto Wake Tare signal, which resets the weight sensor 230 through the processor 254.

During the descent of the top housing 100 under the weight of cylinder 12, a fraction of the cylinder weight (i.e., vertical force) is converted into a rotational motion of the top housing so as to bring the caster bearings 120 to the weight sensor 230. In particular, a vertical impact of the gas cylinder, i.e., the total weight of the cylinder amplified by the speed with which it makes contact, is transferred in a delayed manner to the loadcells 231 of the weight sensor 230.

Simultaneously, a portion of the impact is also absorbed by the compression spring 111, which is compressed against the bottom protruding portion 210. For this reason, the diameter of the compression spring 111 is configured to be substantially the same as that of the bottom protruding portion 210 so that they are pressed against each other. Also, the outer diameter of the torsion spring 211 is larger than the outer diameter of the compression spring 111 so that when the top housing 100 is lowered, the torsion spring 211 can abut the lower surface 102 of the top housing 100 to press the top housing 100 upward. See FIG. 5. As a result, the impact of the gas cylinder's weight on the weight sensors is mitigated. In other words, the impact of the gas cylinder's weight has been reduced before the caster bearings 120 reaches the weight sensor 230 that contains the loadcell 231. Accordingly, the impact of the gas cylinder on the loadcell 231 is minimized, which leads to accurate measurement as well as prolonged product life.

As shown in FIG. 10, the reed switch 240 is provided so as to operate when the scale is in the unloaded position in order to trigger a tare/zero reading of the sensors to account for any potential drift in reading. However, it would be appreciated that other types of switches can be used instead of the reed switch 240 to obtain similar functionality.

In a particular embodiment of the weight measurement device, a transceiver 256 (FIG. 10) is provided for transmitting the weight data from the processor 254 wirelessly to a remote location via a Bluetooth/WIFI/cellular transmission. For example, the weight data can be transmitted to a cellphone carried by an owner or user of the gas cylinder, or to a server located at a cylinder distribution center. Furthermore, the weight data may be transmitted to the cloud, which would make the data accessible from any location with internet connection. By sharing the measured weight data wirelessly with a vendor of the gas cylinders, the vendor can easily be informed of the need to refill or replace a gas cylinder without relying on conventional monitoring methods such as telephone calls to the vendor or installing a camera pointed toward the liquid level of the gas cylinder. As a result, the vendors can efficiently perform their "milk route" to visit users in the service area.

In a further particular embodiment of the weight measurement device described, after the completion of the submission of the weight data and a determination that the cylinder is nearly empty, the gas cylinder is lifted from the weight scale 10. When the gas cylinder 12 is removed, the torsion spring 211 (FIG. 5) urges the top housing 100 to lift and rotate back to its original position. When it reaches its original position, the reed switch 240 on the top housing 100 interacts with the magnet 130 attached to the lower surface 102 of the top housing 100 (FIG. 3) to trigger the weight sensors 230 to reset. As a result, the user can measure the weight of another gas cylinder in an expedited manner. In effect, the magnet 130 triggers the reed switch 240 to reset the load cells to tare a new reading when the cylinder 12 has been removed and the top housing 100 has rotated back to its initial unloaded position and thus the weight sensor 230 is reset for the next cylinder.

Further in another embodiment of the invention, the circuit board 250 triggers the weight sensors 230 to measure the weight of the sensor based on a timed interval that is triggered from the clock of the processor 254 on the circuit board 250 (FIG. 10) to conduct measurements at a rate of hours to days. In this manner, the weight scale 10 is able to process the usage of the cylinder over time While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

The invention claimed is:

1. A weight scale for a gas cylinder comprising:

a first housing with a facing surface;

a second housing, which is located opposite the first housing when the weight scale is assembled and having a facing surface that faces the facing surface of the first housing, said first and second housings being rotatable with respect to each other;

at least one caster bearing rotatably mounted on the facing surface of the first housing;

at least one caster ramp provided on the facing surface of the second housing such that the at least one caster bearing can roll along the at least one caster ramp when the first and second housings are pressed toward each other so that the housings rotate with respect to each other; and at least one weight sensor placed on one of the facing surfaces and having a rest position surface adjacent an end of the at least one caster ramp, wherein the first and second housings stop rotating when the caster bearing reaches and makes contact with the rest position surface, and wherein the at least one weight sensor is configured to weigh the gas cylinder when the caster bearing rolls off the at least one caster ramp and onto the rest position surface of the at least weight sensor to provide weight data.

2. The weight scale according to claim 1, further comprising:

a first protruding porting that is provided at a center of the facing surface of one of the housings and protruding toward the other housing, and a compression spring placed to surround the first protruding portion for urging the housings away from each other.

3. The weight scale according to claim 2, further comprising:

a second protruding portion that that is provided at a center of the facing surface of the other of the housings, said second protruding portion having a through hole into which the first protruding portion is inserted.

4. The weight scale according to claim 3, further comprising:

a torsion spring placed to surround the second protruding portion for urging the housings away from each other.

5. The weight scale according to claim 4, wherein when the gas cylinder is placed on the upper surface of the top housing, its weight acting on the top housing transfers from the top housing to the weight sensors on the bottom housing as the top housing rotates and lowers in relation to the bottom housing and the at least one caster bearing rolls down the at least one caster ramp to rest on the rest position surface.

6. The weight scale according to claim 4, wherein a diameter of the compression spring is substantially the same as a diameter of the second protruding portion so that the compression spring is pressed against the second protruding portion when the gas cylinder is placed on the weight scale.

7. The weight scale according to claim 1, further comprising:

a magnet attached the facing surface one of the housings and a reed switch attached to the facing surface of the other of the housings, which reed switch is closed when in close proximity to the magnet, and wherein the magnet and reed switch are placed along the periphery of the interior of the scale housings such that the magnet triggers the reed switch so that when the cylinder is removed and the first housing rotates back to its initial unloaded position, the reed switch is triggered to reset the tare of the load cell.

8. The weight scale according to claim 1, wherein the weight sensor comprises a loadcell and a grooved plate attached to the loadcell, and the rest position surface of the weight sensor is a groove portion formed on the grooved plate.

9. The weight scale according to claim 1, further comprising:

a transmitter that is configured to transmit the weight data wirelessly to the cloud.

10. The weight scale according to claim 9 wherein the transmission is via Bluetooth/WIFI/cellular.

11. A weight scale for a gas cylinder comprising:

a rotatable top housing with a lower surface and an upper surface adapted to receive the gas cylinder;

a stationary bottom housing with an upper surface, which is located opposite the lower surface of the top housing when the weight scale is assembled; said top housing being capable of being spaced from and rotatable with respect to the bottom housing;

at least one caster bearing rotatably mounted on the lower surface of the top housing;

at least one caster ramp provided on the upper surface of the bottom housing such that the at least one caster bearing can roll down the at least one caster ramp when the top housing is pressed down on the bottom housing so that the top housing rotates with respect to the bottom housing; and at least one weight sensor placed on the upper surface of the bottom housing and having a rest position surface adjacent an end of the caster ramp, wherein the top and bottom housings stop rotating when the caster bearing reaches and makes contact with the rest position surface, and the at least one weight sensor is configured to weigh the gas cylinder when the caster bearing rolls off the caster ramp and onto the rest position surface to provide weight data.

12. The weight scale for a gas cylinder according to claim 11 further including a first protruding porting, about which said top housing rotates, and that is provided at a center of the lower surface of the top housing and protrudes from the top housing toward the bottom housing;

a compression spring surrounding the first protruding portion for urging the first second housings away from each other;

a second protruding portion, about which the bottom housing rotates, and that is provided at a center of the upper surface of the bottom housing and protrudes from the bottom housing toward the top housing;

a torsion spring surrounding the second protruding portion for urging the housings away from each other; and wherein said second protruding portion has a through hole into which the first protruding portion is inserted.

13. The weight scale according to claim 12, further comprising:

a magnet attached to the lower surface of the top housing and a reed switch attached to the upper surface of the bottom housing, which reed switch is closed when in close proximity to the magnet, and wherein the magnet and the reed switch are placed along the periphery of the interior of the scale housings such that the magnet triggers the reed switch when in close proximity, whereby when the cylinder is removed and the top housing rotates back to its initial unloaded position the reed switch is triggered to reset the tare of the load cell.

14. The weight scale according to claim 13, wherein when the gas cylinder is removed, the compression spring and the torsion spring urge the top housing to rotate back and rise to its original position and the detection switch interacts with the magnet to trigger the loadcell to tare a reading to zero so that the reading can be reset.

15. A method for monitoring a weight of a gas cylinder, the method comprising the steps of:

placing the gas cylinder on the weight scale according to claim 13;

measuring the weight of the gas cylinder;

transmitting measured weight data wirelessly to a cloud network where it is continuously logged with respect to time; and automatically resetting the weight sensor after the gas cylinder is removed.

16. The weight scale according to claim 11, wherein the top housing and the bottom housing are made of a material selected from the group consisting of aluminum, steel, high-impact plastic and carbon fiber.

17. The weight scale according to claim 11, wherein the top housing has a plurality of groves on the upper surface thereof, and each of the plurality of grooves extends in a radial direction, whereby sliding of the gas cylinder on the upper surface of the top housing is resisted.

18. The weight scale according to claim 11, wherein the top housing has a plurality of groves on the upper surface thereof, and each of the plurality of grooves extends in a circumferential direction, whereby sliding of the gas cylinder on the upper surface of the top housing is resisted.

* * * * *